United States Patent Office 2,903,378
Patented Sept. 8, 1959

2,903,378
PROCESS OF FORMING LUMINESCENT SCREENS

Thaddeus V. Rychlewski, Seneca Falls, N.Y., assignor, by mesne assignments, to Sylvania Electric Products Inc., Wilmington, Del., a corporation of Delaware No Drawing. Application December 31, 1957
Serial No. 706,279

5 Claims. (Cl. 117—33.5)

This invention relates to image display screens and more particularly to luminescent screens which are formed by vaporization techniques.

Luminescent screens for devices such as cathode ray tubes may be formed by vaporizing phosphor materials upon the glass viewing panel of the tube. Generally, in the vaporization process, it has been found necessary to heat the phosphor coated panel to a temperature of approximately 1000° C. in order to produce a screen having acceptable luminescence. This temperature is much too high to use with conventional cathode ray tube manufacturing techniques and it requires the adoption of expensive high temperature "hard glass" for the panel material. In order to reduce the processing temperature of some types of evaporated luminescent screens, it has been proposed that a corrosive or toxic atmosphere be used in the initial vaporization process or in a subsequent heating operation. However, the utilization of a corrosive atmosphere is expensive and difficult to handle in production and it tends to decrease the screen brightness.

Accordingly, an object of the invention is to reduce the aforementioned disadvantages and to improve the processing of evaporated luminescent screens.

A further object is to produce an evaporated luminescent screen at a temperature which allows the use of "soft glass" as the substrate upon which the luminescent material is deposited.

Another object is to alleviate the need for a corrosive or toxic atmosphere in the production of vaporized luminescent screens.

Another object is the provision of an improved process for fabricating manganese activated zinc phosphate luminescent screens.

The foregoing objects are achieved in one aspect of the invention by the provision of a process for forming a luminescent screen wherein a salt is added to a manganese activated zinc phosphate phosphor and the mixture is evaporated in a vacuum to produce a phosphor coating on the glass substrate. Subsequently, the screen is heated to a temperature substantially within the range of "soft glass" to produce a screen which is ion and electron luminescent.

The luminescent material used in the process comprises manganese activated zinc phosphate while the inorganic salts utilized in the formation of the screen may comprise chlorides, bromides, iodides, etc. of such metals such as sodium and barium.

In accordance with one aspect of the invention, a luminescent screen may be formed by depositing a manganese activated zinc phosphate phosphor in a suitable holder like a carbon boat along with a salt such as sodium chloride. The manganese activator may comprise from 2 to 8 percent and the salt or sodium chloride from 25 to 50 percent of the zinc phosphate by weight. The boat containing these materials is then placed within an enclosure and spaced from the glass panel or substrate which is to be coated. The enclosure is subsequently evacuated and the phosphor material and salt are vaporized substantially concurrently by the energization of an electrical heater wire mounted within or adjacent to the boat to coat the panel. The vaporizing temperature in the immediate vicinity of the heater has been found to be 1100° C.

After the phosphor screen has been deposited upon the face plate of a cathode ray tube, promotion of the phosphor activation may be brought about by heating or baking the tube envelope for a period of time depending upon the temperature employed. Also, during this baking operation, the gasses and moisture present in the glass and screen materials are driven off. The luminescent screen so produced is responsive to ions and electrons to luminesce with a high level of brightness. If desired, an electron permeable light reflective film of aluminum, silver, tin or chromium may be subsequently flashed over the phosphor layer to provide a screen having a high contrast level.

The function of the salt in this process is believed to reside in its ability to promote low temperature crystallization of the phosphors which probably decompose when heated near their melting points. The firing temperature used in the process and the firing time depends upon the color and brightness level desired. It has been found that the time varies from several minutes to two hours while the temperature may range from 400° C. to 600° C. This temperature span is substantially within the "soft glass" and conventional cathode ray tube processing ranges so that the method described herein is well adapted to the utilization of automatic production techniques.

Although several embodiments of the invention have been shown and described, it will be apparent to those skilled in the art that various changes and modifications may be made therein without departing from the scope of the invention as defined by the appended claims.

What is claimed is:

1. A process of forming a luminescent screen upon a glass substrate comprising the steps of heating a mixture of manganese activated zinc phosphate phosphor and an inorganic salt to vapor deposit said phosphor upon the substrate, and heating the phosphor to promote activation thereof.

2. A process of forming a luminescent screen upon a glass substrate comprising the steps of heating a mixture of manganese activated zinc phosphate phosphor and a sodium salt to vapor deposit said phosphor upon the substrate, and heating the phosphor to promote activation thereof.

3. A process of forming a luminescent screen upon a glass substrate comprising the steps of heating a mixture of manganese activated zinc phosphate phosphor and sodium chloride to vapor deposit said phosphor upon the substrate, and heating the phosphor to promote activation thereof.

4. A process of forming a luminescent screen upon a glass substrate comprising the steps of heating a mixture of manganese activated zinc phosphate phosphor and an inorganic salt to vapor deposit said phosphor upon the substrate, and heating the phosphor under 600° C. to promote activation thereof.

5. A process of forming a luminescent screen upon a glass substrate comprising the steps of heating a mixture of manganese activated zinc phosphate phosphor and from 25 to 50 percent by weight of a sodium salt based upon the weight of zinc phosphate to vapor deposit said phosphor upon the substrate, and heating the phosphor to promote activation thereof.

References Cited in the file of this patent

UNITED STATES PATENTS

| | | |
|---|---|---|
| 2,103,053 | Addink | Dec. 21, 1937 |
| 2,545,200 | Fonda | Mar. 13, 1951 |
| 2,592,261 | Fonda | Apr. 8, 1952 |
| 2,600,579 | Ruedy et al. | June 17, 1952 |